Sept. 18, 1934.  E. R. PIERCE  1,973,879
TWO-PART HOOP TYPE GOVERNOR
Filed Sept. 21, 1932  2 Sheets-Sheet 1
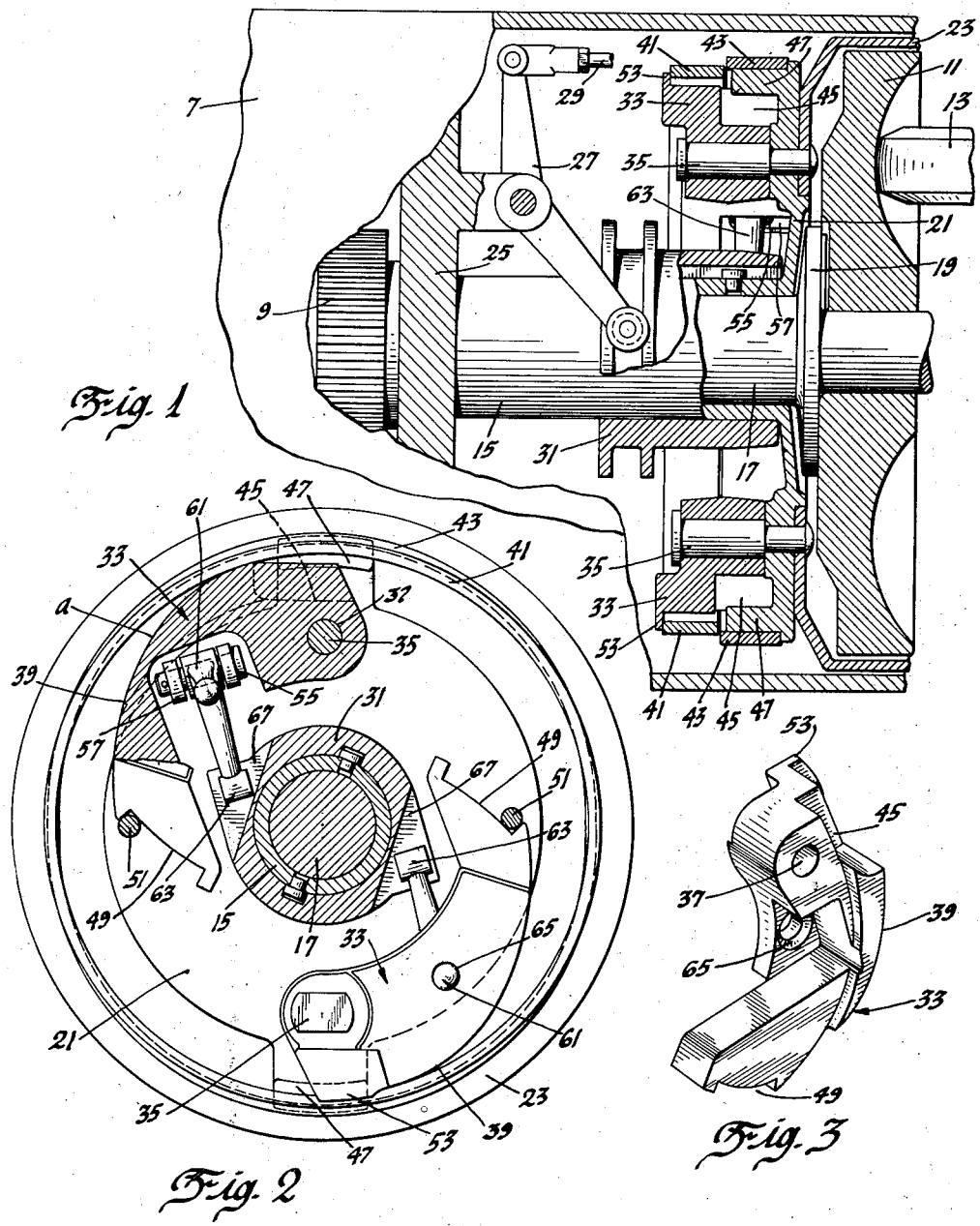
Inventor
Earl R. Pierce
By Blackmore, Spencer & Flint
Attorneys Sept. 18, 1934.   E. R. PIERCE   1,973,879
TWO-PART HOOP TYPE GOVERNOR
Filed Sept. 21, 1932   2 Sheets-Sheet 2

Inventor
Earl R. Pierce
By Blackmore, Spencer & Flint
Attorneys

UNITED STATES PATENT OFFICE 1,973,879

TWO-PART HOOP TYPE GOVERNOR

Earl R. Pierce, Flint, Mich., assignor to General Motors Corporation, Detroit, Mich., a corporation of Delaware Application September 21, 1932, Serial No. 634,093

6 Claims. (Cl. 264—16)

This invention relates to speed-responsive governors. It is of use in many relations where the speed of one mechanism functions to control another mechanism. It has been designed for use in connection with change speed transmission for motor vehicles, and more especially for an infinitely variable type of friction transmission wherein the speed ratio is controlled by the governor which is mounted to be responsive to the speed of one of the shafts, preferably the input shaft.

An object of the invention is to provide a speed governor of extreme simplicity and one comprising few easily machined parts; a governor having non-changing characteristics and giving small response lag. Such a governor has particular utility in a vehicle where it must operate over a wide range of speeds and in which use it may be subject to rapid speed variations.

Among more specific objects, the novel governor provides a changing contact between its centrifugal weights and a hoop type spring; it provides for small hinged pin loads at high speeds; it provides smooth action and freedom from oscillation; it is particularly adaptable for being mounted on the input drum of a double toric friction transmission giving a large radius for the flyweights and consequently high power at low speeds. When so mounted it is quite sufficient to shift the so-called single roller control transmission directly without the use of intermediate servo mechanism or step-up gearing. Its characteristics are reproducible in production without need for adjustment.

Very briefly described it comprises opposite flyweights mounted on drum or driving flange pivots. The weights move in a plane transverse to the driving shaft carrying the flange or drum and are restrained by hoop type springs. These hoop springs are preloaded by being initially stretched from their circular condition. The motion of the weights against the resilient resistance of the successively operable spring hoops is transferred to a collar or sleeve which may slide axially along the driving shaft and the axial movement of which may be transmitted by suitable connections to change the transmission driving ratios. The desired car characteristics are predetermined by the proportioning of the governor parts and by the characteristics of the linkage between the governor weights and the collar and between the collar and the control elements of the transmission.

The invention is illustrated in the accompanying drawings in which Fig. 1 is a view in transverse section.

Fig. 2 is a view partly in elevation and partly in section at right angles to Fig. 1.

Fig. 3 is a perspective of a governor weight.

Figure 4:
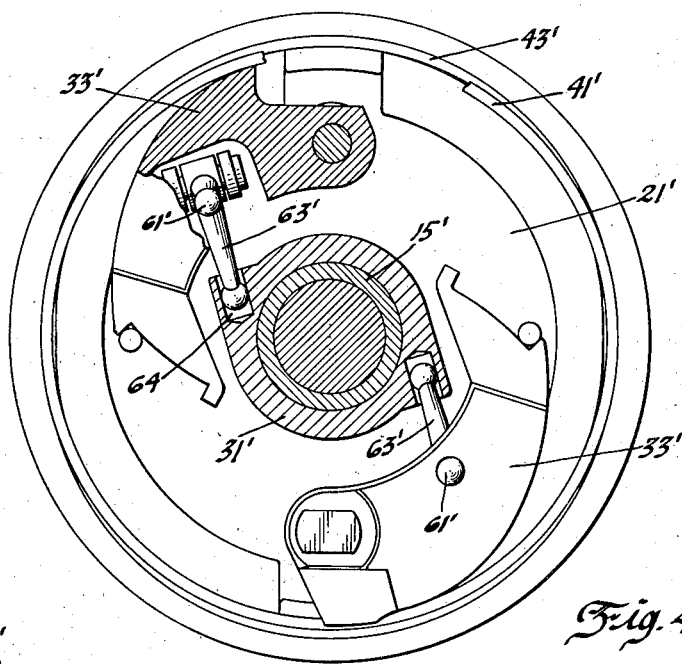
Fig. 4 is a view similar to Fig. 2 but showing a slight modification.

Referring by reference characters to the drawings, numeral 7 represents a housing for enclosing reversing gear mechanism (one gear of which is represented by numeral 9) and ratio-changing mechanism of the disc and roller type, numeral 11 being applied to one of the discs and numeral 13 to one of the rollers. Inasmuch as the invention is not concerned with the details of this type of transmission, it is not fully illustrated or described.

The driving shaft 15 is shown as tubular and surrounds the front end of the driven shaft 17. The latter has a flange 19 non-rotatably associated with disc 11 which may now be described as a driven disc. The driving shaft 15 has a radial flange 21 to which is secured a drum 23. The drum 23 extends over the driven disc 11 and is to be non-rotatably connected to a driving disc, not shown, which is also in rolling engagement with the roller 13.

Pivoted to a partition 25 is a lever 27. A rod 29 extends from one arm of the lever and is operable to shift the angular positions of the rollers relative to the discs to change the driving ratios in a well-known manner. The lever 27 has another arm engaging a collar 31 which is mounted to slide on but which is non-rotatably associated with the driving shaft 15. The sliding movement of this sleeve is effected by the pivotal movements of weights 33, such pivotal movements of the weights being responsive to the rotating movement of the driving shaft and being produced under the influence of centrifugal force. Each weight is pivoted on a pin 35 which may be integral with the means to fasten the flange 21 to the drum 23. The shape of each weight will best be understood by an inspection of Fig. 3. In the weight there is an opening 37 for the reception of the pivot pin 35; an arcuate surface 39 for engaging spring hoops 41 and 43; a recessed region 45 underlying an axial lug 47 projecting from the outer periphery of the radial flange 21; and a slot 49, the end wall of which may engage a pin 51 projecting from the flange 21 whereby the pivotal movement of the weight is limited. Hoop 41 is stretched over the two weights and held in tension thereby, the weights having positioning shoulders as at 53 to retain the hoop in position. The tension of hoop 41 serves to rotate the weights to limiting positions wherein the pins 51 engage the end walls of the slots as shown in Fig. 2. The spring hoop 41 is in engagement with the weights for a limited region of the arcuate surface thereof in the vicinity of the pivots as shown in Fig. 2. Spring hoop 43 is also normally in tension, being so held by being stretched over the axial lugs 47. These hoops are normally out of contact with the weights. As each weight swings about its pivot its arc of engagement with hoop 41 increases and at a certain point of the arc, as at $a$, it picks up the hoop 43 after which further rotation of the weight is resisted by the combined resiliency of both hoops.

The movement of each weight as described is transmitted into a sliding movement of the sleeve by the use of a bell crank. A pin 55 passes through lugs 57 on flange 21. Between the lugs 57 and mounted rotatably on pin 55, is the hub portion of a bell crank having arms 61 and 63. The end of arm 61 enters an opening 65 provided therefor in the weight, and the other arm 63 engages a suitable flat surface as at 67 on the sleeve 31. In this way the sleeve 31 is given a sliding movement which is made use of to change the speed ratios of the transmission through the instrumentality of the lever 27 and rod 29.

Figure 5:
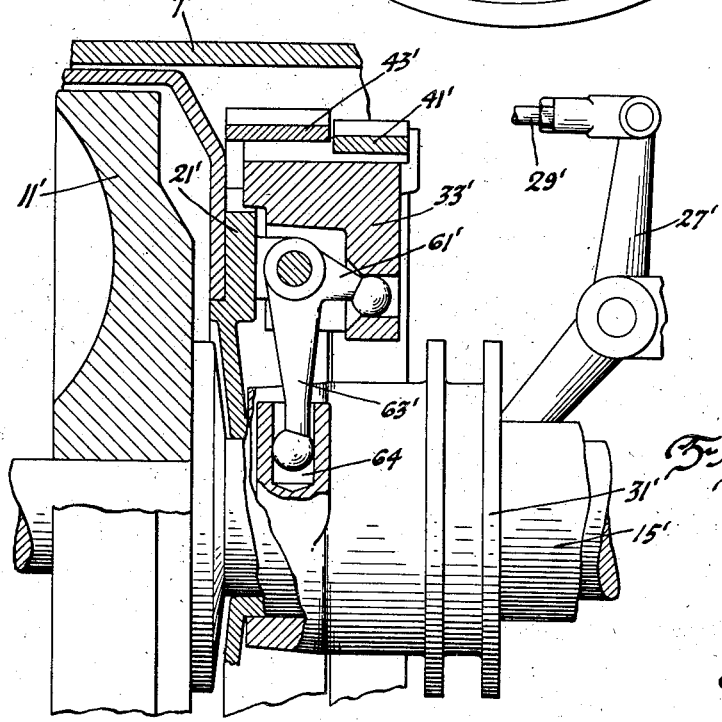
Fig. 5 is a view in elevation and partly in section of the form of the invention shown by Fig. 4.

In Figs. 4 and 5 is shown a slight modification. In these figures 7' is the housing, 11' the driven disc, 15' the driving shaft, and 33' represents the weights acting against spring hoops 41' and 43'. To the flange 21' are pivoted bell cranks as before. Arms 63' of the bell cranks engage in suitable recesses 64 in the sliding collar 31'. Arm 61' engage the weight substantially as in Fig. 2. The lever 27' with its connected rod 29' corresponds in function with the parts 27, 29 of Fig. 1. Except for the engagement of the lever with the collar this second form of the invention is like the form first described.

I claim:

1. In a spring hoop governor, centrifugally operated weights, a plurality of axially spaced spring hoops engaged in sequence by said weights and thereby successively operable to resiliently resist the rotation of the weights.

2. In a spring hoop governor, centrifugally operable weights, a first spring hoop yieldingly resisting the movement of said weights, a second axially spaced spring hoop normally out of engagement with said weights and inoperative but engaged by the weights after a predetermined movement thereof whereby both hoops resiliently resist the movement of said weights.

3. The invention defined by claim 2, said first hoop being flexed in assembly about said weights and thereby preloaded by said weights.

4. The invention defined by claim 2, said first hoop being flexed in assembly about said weights and thereby preloaded by said weights and other means to preload the second hoop.

5. In a governor, centrifugally operated pivoted weights, yielding means to resist the movements of said weights under the influence of centrifugal force, other resilient means axially spaced from said yielding means in the form of a spring hoop and positioned to be engaged by said weights at a predetermined position thereof to supplement the action of said first mentioned yielding means, and mechanism whereby said weights perform work as they move.

6. In a governor, centrifugally operated weights, yielding means to resist the movement of said weights under the influence of centrifugal force, other axially spaced resilient means positioned to be thereafter engaged by said weights and thereby operable to supplement the action of the first resilient means, one of said means taking the form of a spring hoop surrounding and deformed by the movement of said weights.

EARL R. PIERCE.